March 1, 1960

T. M. MARION ET AL 2,927,213

ELECTRONIC CONTROL CIRCUIT

Filed Jan. 29, 1945

INVENTORS
**THOMAS M. MARION
JOHN F. STREIB**

BY

ATTORNEY

United States Patent Office 2,927,213
Patented Mar. 1, 1960

2,927,213

ELECTRONIC CONTROL CIRCUIT

Thomas M. Marion, Houlka, Miss., and John F. Streib, Pasadena, Calif., assignors to the United States of America as represented by the Secretary of the Navy Application January 29, 1945, Serial No. 575,108

2 Claims. (Cl. 250—209)

(Granted under Title 35, U.S. Code (1952), sec. 266)

This invention relates to electronic control systems, particularly to double input signal circuits of the type used in photoelectric proximity fuzes of the double-field-of-view class, such as that disclosed in the copending patent application of Joseph E. Henderson, Serial No. 570,689 filed Dec. 30, 1944, entitled "Fuze," now Patent No. 2,892,093, June 23, 1959.

The principal object of the present invention is to provide a new and improved electrical signal generating and control circuit, compact in arrangement, involving relatively simple components, and having such characteristics as to prevent the firing of the fuze by the direct rays of the sun or other intense illumination, while permitting normal operation and firing by a target even though and while one of the fields of view is "blinded" by the sun.

An object related to that last stated is to provide such an improved electronic signal generating and control circuit which retains a high degree of sensitivity to the relatively small light changes resulting from approach of the fuze to a target, even though the system is simultaneously subjected to intense illumination.

For a better understanding of the invention, together with other and further objects thereof, reference is made to the following description taken in connection with the accompanying drawings, and its scope will be pointed out in the appended claims.

Figure 1:
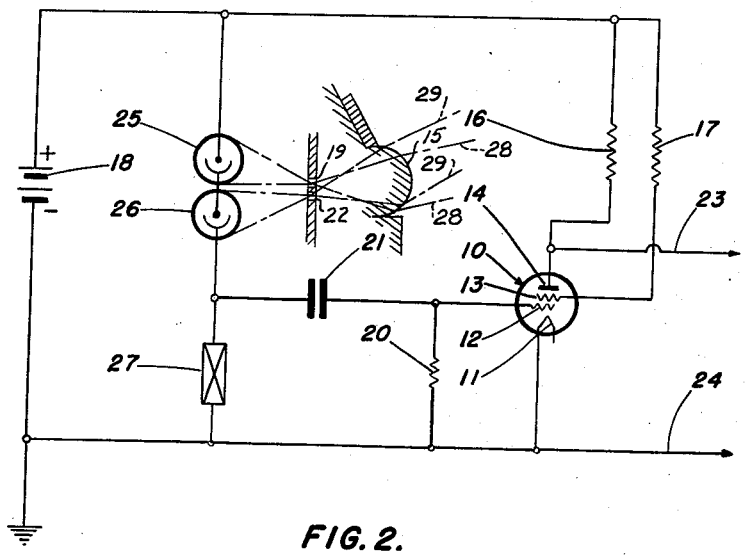
Figure 2:
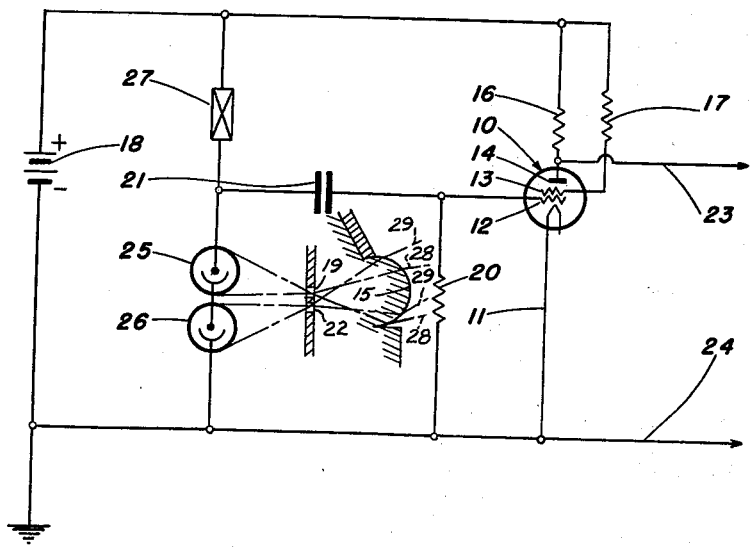

In the drawings, Fig. 1 comprises a schematic of an electronic signal generating and control circuit in accordance with the present invention, coupled to a one-stage amplifier; Fig. 2 comprises a circuit schematic of a modified form of signal generating and control circuit in accordance with the invention, illustrating means for coupling the same to a two-stage amplifier, of which only the first stage is shown.

Referring now particularly to Fig. 1 of the drawings, there is illustrated an amplifier tube 10 of the tetrode type having a cathode 11, control grid 12, screen grid 13, and anode 14. It will be understood that the cathode is provided with a proper source of heating current (not shown). Anode 14 and screen grid 13 are coupled, through resistors 16 and 17 respectively, to a battery source of space current 18. The input circuit electrodes 11, 12 are coupled to a grid-leak resistor 20 which, together with coupling condenser 21, constitutes a self-biasing arrangement. The output circuit of the tube includes conductors 23 and 24, connected, respectively, to the anode and cathode. The construction and operation of the circuit elements so far described are conventional and well known to those skilled in the art, so that further description thereof is deemed unnecessary.

The electronic signal generating and control circuit provided in accordance with the present invention and adapted to control the amplifying tube comprises a plurality of serially related vacuum-type photocells 25, 26, serially connected in circuit with battery 18, which also furnishes anode potential for the photocells. Also serially included in the signal-generating circuit is a non-linear resistor 27 such as that sold under the trade name Varistor. The internal impedances of photocells 25, 26 and the nonlinear resistor comprise a voltage divider shunted across the battery. That part of the voltage divider which includes the nonlinear resistor is coupled through capacitor 21 and grid leak 20 to the input circuit of the tube.

Coming now to the description of the operation of the embodiment just described, reference is made to the above-mentioned copending patent application of Joseph E. Henderson for a complete statement of the operation of fuzes of the double-field-of-vision type and of the electronic circuits incorporated therein. Briefly, however, the above-described circuit functions in such manner that when the generating means 25, 26 comes into the field of view of a target, the attendant light variations effect corresponding variations of photocell current. The last-mentioned variations cause a signal to appear across nonlinear resistor 27. The signal is translated through coupling means 21, 20 to the amplifier tube, there amplified, and applied by conductors 23, 24 to suitable firing means such as a Thyratron tube (not shown) or the like. A decrease in light caused by target proximity causes the high-potential terminal of nonlinear resistor 27 to become less positive, grid 12 therefore becomes less positive and plate 14 more positive. This is the desired operation.

Figs. 1 and 2 diagrammatically illustrate the application to the photocells of a type of lens construction illustrated in the aforesaid copending application of Joseph E. Henderson. The toroidal lens 15 which surrounds the photocells 25 and 26 focuses all incident plane light rays within the band defined by lines 28—28 onto the slit 19 and photocell 25; other incident plane light rays within the band defined by lines 29—29 are focused onto the slit 22 and photocell 26. In this manner means is provided for limiting the field of view of each photocell to separate regions or zones, i.e., light can be transmitted to a particular photocell provided it has origin within the limited zone associated with that photocell. The zones of light transmission for each photocell extend throughout 360° but do not overlap.

If one only of the photocells should become virtually short-circuited due to flooding with sun light or other intense illumination the other photocell continues to operate normally, since the fields of view of the two cells do not overlap. The sensitivity of the signal generating means is then substantially the same as it would be if one normally illuminated photocell were in circuit.

When the sun moves relatively slowly into and out of the region of view of the photocells as during yaw or due to the curving trajectory of the projectile in which the fuze is incorporated, the impedance of the exposed photocell sharply decreases, so that, considered alone, it tends to cause a strong signal to appear across the nonlinear resistor. In order to reduce the tendency to sun firing resulting from the drop in the impedance of the photocell under sun exposure, means for limiting the photocell current to a value slightly larger than that flowing when the photocell is exposed to the prevailing sky illumination is required. Now if it be assumed that cell 25 is flooded, cell 26 functions as a resistance element limiting the current in cell 25 and the signal appearing across nonlinear resistor 27. Moreover, at a low prevailing light level the impedance of cell 26 is relatively high so that it is most effective as a dropping resistor when the sensitivity of cell 25 is relatively great and when cell 25 is relatively more likely to cause sun firing. Conversely, at a high general light level, cell 26 is less effective as a dropping resistor. Since the ability of cell 26 to limit current in cell 25 is automatically adjusted by the general light level, the sensitivity of cell 25 is not substantially impaired by the presence of cell 26.

If cell 26 should be flooded, then cell 25 functions as the current-limiting resistor in the manner indicated.

The impedance of nonlinear resistor 27 decreases with an increase of current therethrough. Therefore, upon an increase in the general light level, this characteristic of the resistor 27 is effective to maintain a higher portion of the battery voltage across cells 25, 26 than would be the case if the resistor were linear. The sensitivity of the photocells is thus preserved through their operating range of general light levels. Moreover, this characteristic of resistor 27 prevents the grid of tube 10 from reaching as high a potential upon flooding of one of the photocells as it would if the characteristic were linear, since the signal across the nonlinear resistor alone is coupled to the grid. Thus it will be seen that the above-described circuit is effective to reduce the variation in signal voltage as the sun moves into and out of the region of view of the fuze and at the same time to maintain the sensitivity of the signal generating means through its operating range.

The decrease in light caused by target proximity causes a decrease in current through the voltage divider network comprising the photocells and nonlinear resistor. The photocells have such a characteristic that, for a given decrease in current, their impedance increases relatively a greater amount than that of the nonlinear resistor. Since the voltage of battery 18 is divided among cells 25, 26 and nonlinear resistor 27, the target signal causes the voltage drop across resistor 27 to decrease and that across cells 25, 26 to increase, as indicated above.

Referring now specifically to the modified embodiment illustrated in Fig. 2, it differs from the Fig. 1 embodiment only in that the tube input circuit is coupled to that part of the signal generating circuit which includes photocells 25, 26 instead of to nonlinear resistor 27. The operation is generally similar to that of Fig. 1 embodiment with the exception that a decrease in light which occurs when the projectile comes into proximity to the target is effective to increase the applied grid voltage of tube 10 and therefore to render the anode voltage less positive. This is the desired operation for a control system adapted to be coupled to a two-stage amplifier, since the second stage effects a 180° phase reversal whereby the anode potential thereof increases in response to a decrease in the input voltage translated thereto from the first stage.

While there have been described what are at present considered to be the preferred embodiments of the invention, it will be obvious to those skilled in the art that various changes and modifications may be made therein without departing from the invention and it is, therefore, aimed in the appended claims to cover all such changes and modifications as fall within the true spirit and scope of the invention.

The invention herein described may be manufactured and used by or for the Government of the United States of America for governmental purposes without the payment of any royalties thereon or therefor.

We claim:

1. An electronic relay comprising a pair of serially connected photocells for generating electrical signals representative of light variations with respect to the lower reference light level to which the cells are exposed, said photocells having means for restricting all incident plane light rays reaching each cell to that having origin within a separate and independent band associated with each cell so that only one of said cells can be exposed at any one time to direct incident sunlight whereby the cell exposed to the lower reference light level will function as a high impedance to limit the electrical current produced by the photocell exposed to direct incident sunlight, a voltage divider circuit comprising an impedance unit serially coupled to said photocells, an electronic amplifier having a cathode and control electrode, a capacitor coupling said control electrode to the voltage divider circuit at the junction of said impedance unit with said photocells for repeating said signals, said cathode being connected to that portion of said voltage divider circuit having a polarity more negative than said junction.

2. An electronic relay comprising a pair of serially connected photocells for generating electrical signals representative of light variations with respect to the lower reference light level to which the cells are exposed, said photocells having means for restricting all incident plane light rays reaching each cell to that having origin within a separate and independent band associated with each cell so that only one of said cells can be exposed at any one time to direct incident sunlight whereby the cell exposed to the lower reference light level will function as a high impedance to limit the electrical current produced by the photocell exposed to direct incident sunlight, a voltage divider circuit comprising a non-linear voltage-sensitive impedance unit serially coupled to said photocells, an electronic amplifier having a cathode and control electrode, a capacitor coupling said control electrode to the voltage divider circuit at the junction of said impedance unit with said photocells for repeating said signals, said cathode being connected to that portion of said voltage divider circuit having a polarity more negative than said junction.

References Cited in the file of this patent

UNITED STATES PATENTS

| 1,415,748 | Weintraub | May 9, 1922 |
| 1,721,216 | Hardy et al. | July 16, 1929 |
| 1,839,864 | Breisky et al. | Jan. 15, 1932 |
| 2,219,189 | Lundstrom | Oct. 22, 1940 |
| 2,360,233 | Hussey | Oct. 10, 1944 |

OTHER REFERENCES

Thermistors in Electronic Circuits, Electronic Industries, January 1945, pages 76–80.